(12) United States Patent
Obeng

(10) Patent No.: US 11,519,344 B2
(45) Date of Patent: Dec. 6, 2022

(54) SYSTEM AND METHOD FOR OPERATING AN ENGINE WITH REDUCED NOX EMISSIONS

(71) Applicant: Yaw Obeng, Frederick, MD (US)

(72) Inventor: Yaw Obeng, Frederick, MD (US)

( * ) Notice: Subject to any disclaimer, the term of this patent is extended or adjusted under 35 U.S.C. 154(b) by 0 days.

(21) Appl. No.: 17/184,576

(22) Filed: Feb. 24, 2021

(65) Prior Publication Data

US 2021/0254564 A1    Aug. 19, 2021

Related U.S. Application Data

(63) Continuation of application No. 16/346,874, filed as application No. PCT/US2017/059614 on Nov. 1, 2017, now abandoned.

(Continued)

(51) Int. Cl.

| | |
|---|---|
| F02D 19/06 | (2006.01) |
| F02M 26/02 | (2016.01) |
| F02D 19/12 | (2006.01) |
| F02D 21/08 | (2006.01) |
| F02D 21/10 | (2006.01) |
| F02D 41/00 | (2006.01) |
| F02D 41/38 | (2006.01) |
| F02M 25/025 | (2006.01) |
| F02M 25/032 | (2006.01) |
| F02M 25/12 | (2006.01) |
| C10L 1/22 | (2006.01) |
| F02M 25/035 | (2006.01) |

(Continued)

(52) U.S. Cl.
CPC ............ *F02D 19/0644* (2013.01); *C10L 1/22* (2013.01); *F02D 19/12* (2013.01); *F02D 21/06* (2013.01); *F02D 21/08* (2013.01); *F02D 21/10* (2013.01); *F02D 41/0025* (2013.01); *F02D 41/0027* (2013.01); *F02D 41/0047* (2013.01); *F02D 41/3827* (2013.01); *F02D 41/3836* (2013.01); *F02M 25/00* (2013.01); *F02M 25/022* (2013.01); *F02M 25/025* (2013.01); *F02M 25/0221* (2013.01); *F02M 25/032* (2013.01); *F02M 25/035* (2013.01); *F02M 25/10* (2013.01); *F02M 25/12* (2013.01); *F02M 26/02* (2016.02); *F02M 2026/009* (2016.02); *Y02T 10/30* (2013.01)

(58) Field of Classification Search
None
See application file for complete search history.

(56) References Cited

U.S. PATENT DOCUMENTS

| | | | | |
|---|---|---|---|---|
| 4,017,268 | A | * | 4/1977 | Gilley .................. C10L 1/02 44/457 |
| 4,382,189 | A | * | 5/1983 | Wilson .................. F02B 43/10 123/1 A |

(Continued)

*Primary Examiner* — Kevin R Steckbauer
(74) *Attorney, Agent, or Firm* — Diana Mederos

(57) ABSTRACT

A method for reducing NOx emissions during operation of an internal combustion engine in commerce which, when burning hydrocarbon fuel as a primary fuel, in the absence of any secondary fuel, has a characteristic stoichiometric ration. The method includes the following: in the absence of electrolytic activity, providing and entraining a quenching species in a gaseous medium and then interacting the quenching species with constituents present during oxidation of the primary fuel in a combustion chamber of the engine.

5 Claims, 8 Drawing Sheets

Related U.S. Application Data

(60) Provisional application No. 62/415,724, filed on Nov. 1, 2016.

(51) Int. Cl.
*F02M 25/10* (2006.01)
*F02M 25/00* (2006.01)
*F02M 25/022* (2006.01)
*F02D 21/06* (2006.01)
*F02M 26/00* (2016.01)

(56) References Cited

U.S. PATENT DOCUMENTS

| | | | | |
|---|---|---|---|---|
| 4,463,734 A * | 8/1984 | Akeroyd | | F02D 19/0678 123/576 |
| 5,178,118 A * | 1/1993 | Nakamats | | F02D 19/081 123/3 |
| 5,584,894 A * | 12/1996 | Peter-Hoblyn | | C10L 1/328 44/357 |
| 6,368,367 B1 * | 4/2002 | Langer | | B01F 33/811 44/302 |
| 7,021,249 B1 * | 4/2006 | Christison | | F02B 43/10 123/3 |
| 7,222,015 B2 * | 5/2007 | Davis | | F02D 19/027 701/104 |
| 7,290,504 B2 * | 11/2007 | Lange | | F02D 19/0671 123/304 |
| 7,458,368 B1 * | 12/2008 | Huffman | | F02M 25/14 205/628 |
| 7,789,047 B2 * | 9/2010 | Kuroki | | F02D 19/0628 123/3 |
| 8,214,128 B2 * | 7/2012 | Watkins | | F02D 19/029 701/103 |
| 8,903,630 B2 * | 12/2014 | Pursifull | | F02D 41/0027 701/107 |
| 9,038,606 B1 * | 5/2015 | Joshi | | F02D 19/0602 123/526 |
| 9,340,881 B2 * | 5/2016 | Packer | | C25B 15/08 |
| 9,388,749 B2 * | 7/2016 | MacDonald | | F02D 41/1446 |
| 10,016,731 B2 * | 7/2018 | Lewis | | F02M 25/12 |
| 10,253,685 B2 * | 4/2019 | Alexander | | F02M 21/02 |
| 10,308,888 B1 * | 6/2019 | Schwab | | C10L 1/224 |
| 10,465,300 B2 * | 11/2019 | Lin | | C25B 15/08 |
| 10,494,992 B2 * | 12/2019 | Johnson | | B01D 46/84 |
| 10,578,034 B2 * | 3/2020 | MacDonald | | F02D 41/0027 |
| 10,605,162 B2 * | 3/2020 | Johnson | | F02M 21/0287 |
| 10,619,562 B2 * | 4/2020 | Johnson | | C25B 9/17 |
| 10,746,094 B2 * | 8/2020 | Johnson | | F02M 21/0278 |
| 10,767,269 B2 * | 9/2020 | Alcon | | C25B 11/00 |
| 11,092,092 B2 * | 8/2021 | Turner | | F02D 19/081 |
| 11,180,858 B2 * | 11/2021 | Lin | | C25B 1/04 |
| 11,280,261 B2 * | 3/2022 | Johnson | | F02M 35/10216 |
| 11,359,581 B2 * | 6/2022 | Miller | | C25B 9/07 |
| 2002/0017271 A1 * | 2/2002 | Suckewer | | F02M 27/045 123/297 |
| 2004/0074781 A1 * | 4/2004 | Klein | | C25B 9/17 205/628 |
| 2005/0217613 A1 * | 10/2005 | Ambrosini | | F02B 77/04 123/25 A |
| 2005/0229872 A1 * | 10/2005 | Lange | | F02D 19/0671 123/585 |
| 2006/0090712 A1 * | 5/2006 | Ehresman | | F02M 25/12 123/3 |
| 2007/0277438 A1 * | 12/2007 | Lynch | | C01B 3/48 48/197 R |
| 2008/0223344 A1 * | 9/2008 | Suzuki | | F02D 19/0671 123/3 |
| 2009/0283420 A1 * | 11/2009 | Schadeck | | C25B 1/04 205/633 |
| 2010/0065419 A1 * | 3/2010 | Richardson | | C25B 1/04 204/228.2 |
| 2010/0180838 A1 * | 7/2010 | Lewis, III | | F02M 21/0227 123/3 |
| 2010/0206721 A1 * | 8/2010 | Snidvongs | | F02M 25/12 204/229.8 |
| 2010/0217500 A1 * | 8/2010 | Watkins | | F02D 19/029 701/103 |
| 2010/0288212 A1 * | 11/2010 | Williams | | F02M 25/12 123/3 |
| 2011/0220039 A1 * | 9/2011 | Nowicki | | C25B 15/00 204/278 |
| 2013/0125454 A1 * | 5/2013 | Lewis | | C10L 1/1208 44/457 |
| 2013/0220274 A1 * | 8/2013 | Deshpande | | F02D 19/022 123/350 |
| 2015/0159284 A1 * | 6/2015 | Packer | | C25B 11/00 204/276 |
| 2015/0176509 A1 * | 6/2015 | Lavertu | | F02D 41/0027 123/27 GE |
| 2015/0226113 A1 * | 8/2015 | Alexander | | F02D 41/30 123/3 |
| 2015/0226141 A1 * | 8/2015 | MacDonald | | F02D 41/0027 701/104 |
| 2015/0275780 A1 * | 10/2015 | MacDonald | | F02D 41/0027 123/480 |
| 2018/0290112 A1 * | 10/2018 | Lewis | | B01F 23/2319 |
| 2019/0017448 A1 * | 1/2019 | Monros | | F02B 43/12 |
| 2019/0257254 A1 * | 8/2019 | Obeng | | C10L 1/22 |
| 2019/0360689 A1 * | 11/2019 | Bartolo | | F01N 3/08 |
| 2019/0382674 A1 * | 12/2019 | Schwab | | C10L 1/2222 |
| 2021/0254564 A1 * | 8/2021 | Obeng | | F02M 25/035 |

* cited by examiner

SYSTEM AND METHOD FOR OPERATING AN ENGINE WITH REDUCED NOX EMISSIONS

BACKGROUND

Vehicle emissions, such as CO, CO2, SOx, NOx and particulate matter (PM) have significant health and socio-economic impacts while efforts to mitigate these continue to create significant economic burdens on many industries. Despite significant improvements in many metropolitan regions since the implementation of clean air standards, there remain continued demands for further emissions reductions to improve health and welfare. However, as emissions standards become more stringent, the cost of compliance is expected to become more burdensome, with growing concern that compliance can adversely affect engine performance. Further, equipment capable of providing compliance with existing requirements is subject to high maintenance and reliability problems, at times causing disruption in the engine operation.

Emission levels of air pollutants from engines may be optimized under limited conditions, e.g., for emissions certification tests, without testing in other engine operating ranges, such as high rpm, high load, highly transient high output operation, and prolonged low-load operation. As a result, it can be expected that emissions levels during real-world driving can be higher than the levels observed during limited certification tests.

Air pollutants in vehicular emissions are commonly controlled with exhaust gas recirculation (EGR) systems which re-use exhaust gases to manage the composition of the air-fuel mix during combustion. Typically, EGR systems recirculate gases from the exhaust manifold through the air intake manifold to reduce oxygen concentration in the combustion chambers 18, effectively rendering the mixture fuel rich. The recirculated exhaust gases entering the air intake manifold may range from 10 percent to over 50 percent.

Use of EGR to reduce NOx operation is premised on the theory that, with relatively rich fuel content in the combustion chamber, the combustion reaction is shifted further below the stoichiometric ratio, this reducing the combustion temperature to a level below the thermal NOx generation temperature. Whereas the EGR approach can result in about a fifty percent net reduction in NOx emissions, other sources of NOx, such as prompt NOx, become important contributing sources of pollutants under these conditions.

EGR operation causes increased heat rejection as the amount of recirculated exhaust increases, requiring a larger cooling system. Also, with exhaust gas recirculation diluting the volume percent of oxygen entering the engine from the intake manifold, the engine power density expectedly decreases. Consequently, more soot is generated and more unburned hydrocarbons are carried out the exhaust. Thus, an effort to limit NOx emissions results in elevation of another type of emission. With regulatory limits on both particulate matter and unburned hydrocarbons, efforts to reduce NOx have made it necessary to incorporate additional equipment in the engine exhaust system. These equipment add-ons can be of limited efficacy. For example, some diesel particulate filters only remove about eighty five percent of the particulate matter in the exhaust gases. The EGR systems may require additional components to overcome or offset the aforementioned drawbacks. Moreover, EGR systems cannot, alone, provide sufficient NOx emission reductions to comply with many current and future emissions requirements.

Due to the aforementioned drawbacks of EGR systems, other strategies to reduce NOx emissions, such as, selective catalytic reduction (SCR) have been developed for diesel engines. SCR systems inject an aqueous solution of urea into the exhaust flow in the presence of a catalyst to convert the NOx into molecular nitrogen and water. Treatment of exhaust gases by catalytic reduction, in combination with EGR, has enabled engine operations to comply with current regulatory requirements. Yet these supplemental NOx reduction systems are mechanically and chemically fragile. They present reliability problems which can create disruptions to the flow of commerce. There is continued need for more reliable methods and equipment operation for mitigating NOx production in diesel engines. Further, as emissions limits become more stringent, there is a need for new mitigation solutions. Ideally, alternate means for reducing NOx emissions should completely supplant the need for EGR systems and not create side effects which adversely affect engine performance or require additional control equipment. In one series of embodiments, the present invention provides a reliable chemical method for controlling generation of NOx by suppressing a primary mechanism of NOx formation.

It has been observed that modest reductions in NOx emissions are achievable by shifting from a fuel-rich AFR relative to the stoichiometric point to provide a fuel-lean combustion. As noted in the context of EGR systems, in the past this has adversely affected the quality of the combustion, resulting in substantial losses in power and increased emissions of hydrocarbons.

U.S. Pat. No. 9,388,749, now incorporated herein by reference, teaches that, with a gaseous secondary fuel present in the cylinders, adverse effects of reducing the fuel-to-air ratio are less severe than when running the engine without the secondary fuel. Consequently, there is an expanded range of acceptable air-to-fuel ratio from which an optimum ratio can be selected to improve fuel economy and or lower NOx emissions. A feedback control loop may be provided to use a parameter in an algorithm which generates an adjustment value to mitigate NOx emissions. The control loop may also be used to adjust the measured parameter by modifying an input variable, e.g., the air-to-fuel ratio. Weighting functions may be assigned to determine relative influence of multiple control loops. The weighting functions may vary temporally or based on engine operating conditions, including ambient states.

A method according to one embodiment of the present invention more generally provides for addition of an adduct to the air-fuel mixture. After entering the combustion chambers of a combustion ignition (CI) engine, the components of the adduct disassociate to provide a free nitrogen quenching species to mitigate NOx formation. When combined with addition of a species of Reactive Hydrogen that undergoes oxidation in the combustion chamber, reductions in NOx emissions, on the order of 75% or more are attainable during operation of TDI diesel engines.

Of the several species of nitrogen oxides (NOx) emitted during hydrocarbon fuel combustion, NO2 is known to have the most adverse effects on health. High concentrations of NO2 cause inflammation of the airways and reduced lung function. More generally, NOX contributes to the formation of secondary airborne inorganic particulate matter (PM) and atmospheric ozone (O3). There is a need to provide improved ways to reduce NOx emissions levels which reduce mitigation costs as well as the levels of emissions.

SUMMARY OF THE INVENTION

In one embodiment a method is provided for reducing NOx emissions during operation of an internal combustion engine in commerce which, when burning liquid hydrocarbon fuel as a primary fuel, in the absence of any secondary fuel, has a characteristic stoichiometric ratio. The method includes providing a free nitrogen quenching species for interaction with constituents present during oxidation of the primary fuel in a combustion chamber of the engine while operating the engine at an air-to-fuel ratio greater than the characteristic stoichiometric ratio.

In another embodiment of a method is provided to actively control output of OH-entrained gas, from a secondary gas production system, with an engine management system comprising an engine control unit (ECU), the method comprising selecting different look-up tables or sets of data values based on engine operating conditions to vary secondary gas production to decrease NOx emissions and optimize fuel consumption under multiple engine operating conditions.

A method is also provided for programming an Electronic Control Unit for an engine based on sensor data gathered to define each in a plurality of sets of engine control settings, also referred to as defining look-up tables, to assign sets of values of variables for use in engine management and secondary gas generation. The method includes (i) determining, based on collected sensor data, sets of values for each of multiple different engine operating conditions to minimize NOx emissions based on inputting a variable amount of a secondary gas into a combustion chamber of the engine, and (ii) selecting a set of values to apply to an operating condition based on sensor data acquired indicative of the operating condition, the different sets of values including data providing different AFR values based on different engine operating conditions and the values in different sets including different secondary gas generation rates.

Also according to the invention an embodiment of a method is for reducing NOx emissions during operation of an internal combustion engine which, when burning hydrocarbon fuel as a primary fuel, in the absence of any secondary fuel, has a characteristic stoichiometric ratio. The method includes (i) providing a free nitrogen quenching species in an aqueous solution, (ii) entraining the quenching species in a secondary gas by either aerating the solution with a gas or by passing the gas through the solution where providing and entraining occur in the absence of electrolytic activity that would produce Reactive Hydrogen from water molecules. The secondary gas is injected into a combustion chamber of the engine while operating the engine at an air-to-fuel ratio greater than the characteristic stoichiometric ratio for interaction of the quenching species with constituents present during oxidation of the primary fuel.

According to still another embodiment, a method is provided for reducing NOx emissions during operation of an internal combustion engine in commerce which, when burning hydrocarbon fuel as a primary fuel, in the absence of any secondary fuel, has a characteristic stoichiometric ratio. The method includes: in the absence of electrolytic activity, providing and entraining a quenching species in a gaseous medium; and then interacting the quenching species with constituents present during oxidation of the primary fuel in a combustion chamber of the engine.

DESCRIPTION OF THE INVENTION

Before describing in detail the particular methods and systems and components relating to embodiments of the invention, it is noted that the present invention resides primarily in a novel and non-obvious combination of components and process steps. So as not to obscure the disclosure with details that will be readily apparent to those skilled in the art, conventional components, connections and steps have been omitted or presented with lesser detail, while the drawings and the specification describe in greater detail other elements and steps pertinent to understanding the invention. Further, the following embodiments do not define limits as to structure or method according to the invention but provide examples which include features that are permissive rather than mandatory and illustrative rather than exhaustive.

Figure 1:
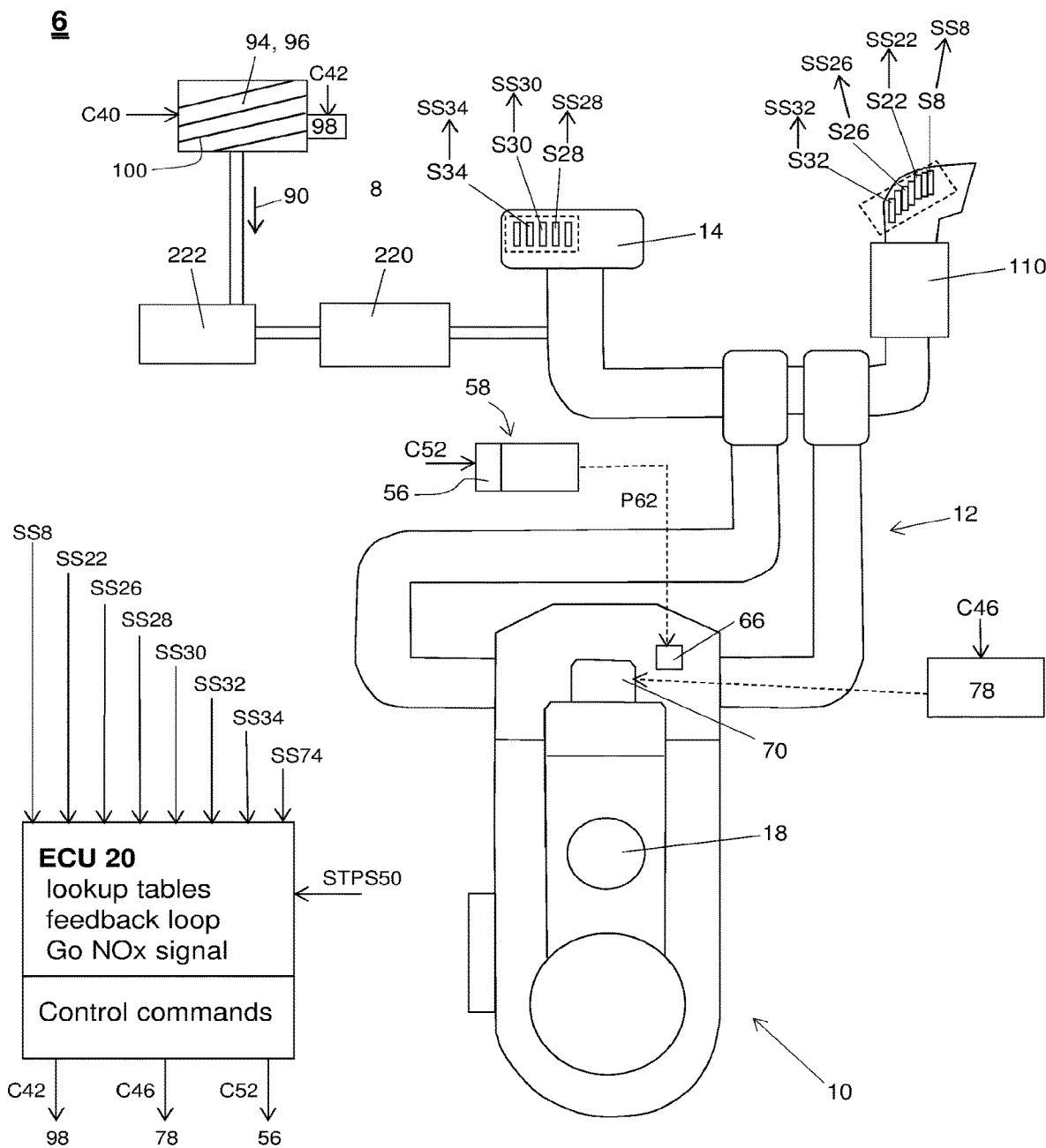
FIG. 1 schematically illustrates a Turbocharged Direct Injection (TDI) diesel engine and an associated dual fuel control system.

FIG. 1 schematically illustrates a multi-cylinder engine system 6 comprising an exemplary emissions control system 8 configured for operation with an exemplary multi-cylinder Turbocharged Direct Injection (TDI) combustion ignition (CI) diesel engine 10. The emissions control system 8 includes a gas production module 94 which provides a secondary gas 90 as an input to the engine combustion chambers 18. In one embodiment the gas production module 94 may be based, in whole or part, on a design which generates reactive hydrogen by performing electrolysis of water present in a KOH aqueous solution provided in a tank 96, as described in U.S. Pat. No. 9,388,749. In certain embodiments the aqueous solution is referred to as an electrolytic bath.

Other embodiments of the gas production module 94 generate a free nitrogen quenching species. That is, in a chemical reaction that destroys the activity of a primary reactive species, e.g., free nitrogen, by combining it with a secondary species, creation of the new combined tertiary species renders the reactive species in the combination inactive. When the primary reactive species is free nitrogen, the secondary species, referred to as a quenching species, may be reactive hydrogen, e.g., OH. The free nitrogen quenching species may be provided with minimal or no electrolysis. In such implementations the gas production module 94 may include a pump 98 which injects air or another gas into the tank 96. With, for example, the tank containing the KOH solution, OH— and water present in the KOH solution may become entrained in a flow of the secondary gas 90 travelling through the solution and into the combustion chambers 18.

In an exemplary method for reducing NOx emissions during operation of the engine 10 burning Petro diesel as a primary fuel, a free nitrogen quenching species interacts with constituents present during oxidation of the primary fuel in the combustion chamber 18. The engine may be operated at an air-to-fuel ratio greater than the characteristic stoichiometric ratio (e.g., 14.9) and a secondary gas 90 injected into the combustion chamber may be a result of electrolysis or may otherwise be based on entrainment of a free nitrogen quenching species. The free nitrogen quenching species may be an electron donor species selected from the group consisting of OH— (e.g., OH⁻ present in a KOH solution), amines (R3N where R=H, CH3 or C2H5), and quaternary ammonium hydroxide (R4NOH where R=CH3 or C2H5, etc.). The free nitrogen quenching species may be a reactive nitrogen chelating metal (M), where M is a Group IA metal, a Group 2 metal or is selected from the group consisting of Mg, Be, Zn, Cd, B, Al, Ga, In, Zr, Ti, Sn and Cu, Li and Na. The illustrated embodiments suppress formation of one or more NOx species (e.g., NO, NO2, N2O, N2O2, N2O3, N2O4) in the CI engine 10 while operating with Petro diesel as the primary fuel, although other embodiments of the invention may be applied to a variety of internal combustion engine types (e.g., spark ignition (SI) and turbine engines) and with a variety of other primary fuel types, including gasoline, other petroleum distillates, and synfuels, including those synfuels derived from biomass or gaseous hydrocarbons.[0023] The engine 10 comprises an engine fuel system 12 and an air intake system 14, several components of which are shown in relation to the engine 10. The engine includes a series of combustion chambers/cylinders 18, one of which is shown in the side view of the engine 10 shown in FIG. 1. An Engine Control Unit (ECU) 20 receives data on engine state conditions from a plurality of sensors to determine how the engine electronic control system operates. The ECM also stores the calibration values that define rated horsepower, torque curves, and rpm specifications.

Through sensor readings, the ECU 20 applies direct measurements of state conditions to determine, for example, fuel delivery rate and AFR. More generally, the ECU 20 generates a series of command signals (e.g., for control of fuel pump pressure, secondary gas generation output rate, fuel injector operation and air intake pressure) to control engine operation. The ECU also monitors engine operating variables (e.g., Throttle Position, RPM, fuel rail pressure) and settings (e.g., crank position and cam phase). Sensor values are monitored to indicate the following: exhaust gas temperature sensor S22 values SS22, manifold absolute pressure (MAP) sensor S24 values SS24, exhaust pressure sensor S26 values SS26, and barometric pressure sensor S28 values SS28. The system also includes sensor S30 monitoring intake air temperature values SS30, monitoring O2 sensor S32 values SS32 in the exhaust gases and monitoring the Mass Air Flow (MAF) values SS34 with sensor S34.

For a given load demand, the ECU 20 issues command signal C40 and C42 to control injection of current and/or injection of gas into the production module 94. The command signal C40 adjusts pulse width modulation to control current through switching MOSFETs in current control circuitry of the module 94. In turn, this controls the output level of secondary gas, generated by electrolysis, comprising reactive hydrogen. Command signal C42 adjusts input of gas from the pump 98 into the tank 96 to control the rate of production of the secondary gas comprising a quenching species as further described herein. The ECU 20 also generates command signals to adjust combustion parameters, including command signal C46 which adjusts the fuel injector pulse width. Upon sensing demand for more fuel via a throttle position sensor signal STPS50, generated from a throttle position sensor TPS50 (not shown), command signals C52 are sent from the ECU 20 to the driver module 56 of a fuel pump 58 to adjust fuel pressure P62 output from the pump to the fuel rail 66 to feed the fuel injectors 70. The ECU monitors pressure signals SS74 generated by a fuel pressure sensor S74 (not shown) positioned at the fuel rail 66 near the injectors 70 to control the response of the fuel pump 58 by varying command signals C52 input to the fuel pump driver module 56 accordingly. The ECU also generates command signals C46 to control injector timing and pulse width to meet sensed engine load demands and attain a desired Air-to-Fuel Ratio (AFR). Fuel rail pressure may vary based on the timing of the injection pulse.

The ECU monitors and adjusts crank position and cam phase as a function of load (e.g., through look up tables) to create a valve timing overlap by which both the intake and exhaust valves are open together. This allows the remaining gas to be scavenged, thereby reducing combustion chamber temperatures to further suppress thermal NOx production.

The illustrated fuel control system differs from conventional systems by providing electronic control of NOx emissions as a function of operating conditions. In this example, the fuel control system also adjusts the volumetric flow rate of a secondary gas 90 input to the combustion chambers 18. The secondary gas 90 may comprise an adduct molecule which flows through the air intake manifold to the cylinder chambers 18. In one embodiment, the adduct molecule comprises a quenching species that disassociates from the molecule when subjected to high temperatures.

In one embodiment, the adduct may be an aggregate of different chemical species, held together by weak forces such as hydrogen bonding or van der Waal bonding. The adduct may then be a H2O. OH" aggregate in which there are weak bonds between the oxygen atom in the OH" anion and the two hydrogen atoms in the water molecule This adduct dissociates under high temperature conditions during oxidation of the primary fuel in the combustion chamber to provide OH" species capable of mitigating NOx formation. The secondary gas 90 may be a secondary fuel further comprising one or multiple species of Reactive Hydrogen. The Reactive Hydrogen species may include an oxidant or a fuel component. On the other hand, the secondary gas 90 may simply comprise the adduct entrained in air. The air may contain water vapor.

The term Reactive Hydrogen as used herein and in the claims means products which contain atomic hydrogen (H) or molecular hydrogen (H2) or hydrogen in the form H+, OH—, O-H+ or H2O2 suitable for use in an internal combustion engine to facilitate performance and mitigation of NOx generation when burning a primary fuel such as Petro diesel. The Reactive Hydrogen may be a component of the secondary gas 90 while the secondary gas contains other components such as H2O. When the gaseous product is generated by electrolysis the product generally includes oxygen where the ratio of hydrogen to oxygen is 2:1 and the combination of constituents is referred to as oxyhydrogen or HHO. Although disclosed embodiments of the invention include hydrogen generation systems which produce one or more species of Reactive Hydrogen, the secondary gas 90 may comprise a pre-prepared secondary fuel containing Reactive Hydrogen. In specific embodiments, a hydrogen generation system may produce Reactive Hydrogen in situ in the presence of heat and a catalytic material such as copper. For example, a light hydrocarbon such as methane may be passed through a variable number of heated copper tubes to provide a supply of Reactive Hydrogen. The process may involve generation of a plasma or thermal cracking or a uv photoelectric process.

The effects of the several species of Reactive Hydrogen on controlling emissions is not easily predicted, in part because any of multiple chemical mechanisms can influence the outcome, depending on the reaction conditions. Optimum conditions must be determined in order to obtain the beneficial effects of adding the Reactive Hydrogen species to the oxidant-fuel premix. For example, HHO is, in part, an oxidant. Introducing HHO into the intake air manifold results in higher oxidant concentration, which leads to leaner mixtures and reduced flame temperatures. Addition of Reactive Hydrogen species into the combustion chamber gas mixture is believed to change the fuel combustion mechanisms at the atomic level and alter complex pollutant formation dynamics. HHO will not always reduce NOx and in some circumstances will increase NOx generation. In fact, there can be a sharp increase in NOx emissions when cylinder temperature exceeds the threshold temperature (around 1100° C.) for NOx formation. Yet, under specific circumstances identified through experimentation, the NOx emission levels can be reduced by the presence of certain Reactive Hydrogen species.

Proportional changes in one or multiple input variables, e.g., changes in concentration of the quenching species or the Oxidant to Fuel Ratio (OFR) can optimally minimize generation of NOx emissions. The fuel control system illustrated in FIG. 1 is programmable to optimize engine performance while reducing the NOx emissions, or to minimize the NOx emissions while sustaining acceptable engine performance, e.g., power and fuel efficiency. In principle, the engine system 6 comprising an emissions control system 8, can minimize generation of NOx emissions while operating the engine at a fuel-lean AFR, e.g., a ratio greater than about 14.9 for the TDI engine 10, recognizing that the effective OFR is influenced by presence of oxidant and fuel species of Reactive Hydrogen sent into the combustion chamber as part of the secondary gas 90. On the other hand, the emissions control system 8, while operating without generating fuel species of Reactive Hydrogen, can also adjust the engine to a fuel-lean AFR, and vary other parameters, including the volumetric flow rate of the secondary gas 90 and the level of Exhaust Gas Recirculation (EGR) to minimize generation of NOx emissions. In either case, based on other data, such as exhaust gas temperature, the system may be programmed to adjust variables such as AFR or OFR to reduce combustion temperatures and thereby prevent generation of NOx by thermal NOx mechanisms.

The fuel control system adjusts proportions of oxidant (or air) and fuel to enhance suppression of the NOx emissions when at least the quenching species component interacts with nitrogen in the combustion chamber.

Referring to FIG. 1, the air intake system 14 may be coupled to receive a secondary gas 90 comprising a Reactive Hydrogen quenching species which, for example, may be an OH link which disassociates from the adduct. The exemplary OH" species interacts with, for example, one or multiple combustion intermediates to facilitate driving the fuel oxidation toward a more complete burn. The quenching species ties up reaction intermediaries (e.g., N atoms or nitrogen-containing radicals) to limit production of NOx species and enable the more complete oxidation of the carbonaceous fuel. The quenching mechanism appears to be particularly effective in mitigating thermal NOx production.

For embodiments in which the gas production module 94 generates products of water electrolysis, it is believed the OH— becomes entrained in the flow of the secondary gas generated in the module and acts as a quenching species to limit formation of NOx. When the source of the secondary gas 90 is an aqueous solution of the quenching species, through which there is a gaseous flow, such as air or another gas bubbled through the reservoir by the pump 98, only water vapor and the adduct comprising the quenching species in the reservoir may become entrained as constituents in the flow of the secondary gas 90. Movement of air or other gas into the aqueous solution is generally referred to as a gaseous flow, which can refer to bubbling of gas into the solution or aeration.

The invention departs from conventional emissions control by enabling control over the generation of nitrogen oxides and thereby reducing the costly burden of add-on mitigation equipment typically required for vehicle compliance, which equipment reduces combustion efficiencies or imposes costly after-combustion solutions. Rather, comparative measurements of vehicle performance for embodiments of the invention indicate that a reliable chemical process may be introduced in the combustion chamber to suppress the formation of one or plural NOx species.

Operation of methods according to the invention is not limited to a particular theory. Yet, discussion of one potential explanation of how a quenching species might effectively mitigate NOx emissions may provide insight for optimally mitigating NOx emissions. Consideration is given to the relative importance of three distinct mechanisms for NOx formation in CI engines. Generation of NOx emissions begins at the start of the chain of combustion reactions with these mechanisms, which are commonly referred to as thermal NOx, prompt NOx, and fuel NOx.

Thermal NOx is formed by high-temperature chemical reactions. The principal reactions governing the formation of thermal NOx from molecular nitrogen, referred to as the Zeldovich mechanism, are:

$$O \pm N_2 \rightleftharpoons N + NO \qquad (1)$$

$$N + O_2 \rightleftharpoons O + NO \qquad (2)$$

Prompt NOx formation is associated with the CH-radical. During fuel combustion, CH radicals readily react with molecular nitrogen to form HCN, which then reacts quickly to form NOx, as shown in reaction 3:

$$HCN + O_2 + N \rightarrow NO, NO_2, CO_2, H_2O, \text{trace species} \qquad (3)$$

Fuel NOx becomes a significant pathway when the fuel contains organo-nitrogen compounds as described by the reaction of Equation (4):

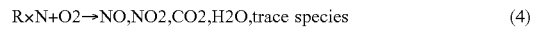

$$R \times N + O_2 \rightarrow NO, NO_2, CO_2, H_2O, \text{trace species} \qquad (4)$$

In an effort to more completely mitigate NOx emissions, multiple combustion process variants were evaluated for possible effectiveness in limiting NOx generation resulting from a combination of the Thermal NOx mechanism and the prompt NOx mechanism.

Figure 2:
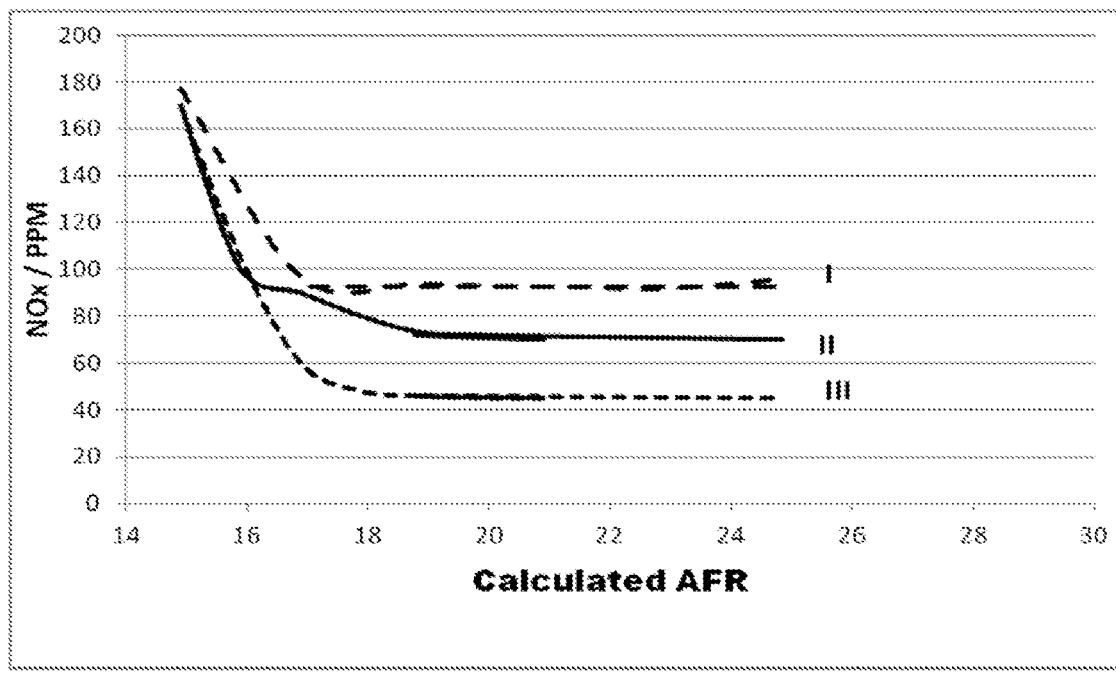
FIG. 2 illustrates reductions in NOx emissions achievable with the TDI engine of FIG. 1, as a function of AFR values greater than the stoichiometric ratio for diesel fuel.

Functional dependencies were measured during operation of two different 2.0 Liter TDI diesel engines. FIG. 2 illustrates observed reductions in NOx emissions as a function of AFR values greater than the stoichiometric ratio for diesel fuel, i.e., greater than approximately 14.9, as a control, without introducing any species of Reactive Hydrogen or other quenching species; entrainment of hydroxyl radicals (OH—) in a secondary gas 90, created by bubbling air from the pump 98 through the tank 96, with no electrolysis, and injecting the air into the combustion chambers 18, while varying AFR among values greater than the stoichiometric ratio for the diesel fuel; and entrainment of hydroxyl radicals (OH—) and multiple other species of Reactive Hydrogen created by electrolysis (e.g., oxygen and atomic or molecular hydrogen), in a secondary gas 90 sent into the combustion chambers 18, while varying AFR among values greater than the stoichiometric ratio for diesel fuel.

Curve (i) of FIG. 2 illustrates an asymptotic decrease in NOx emissions as AFR values were increased relative to the stoichiometric ratio for the diesel fuel, i.e., while holding the volumetric flow rate of fuel into the engine constant and without introducing any Reactive Hydrogen species. The NOx emissions dropped by up to about 45 percent as the AFR increased relative to the stoichiometric ratio. However, the reductions in NOx emissions, as AFR was increased, were accompanied by reduced engine power and increased generation of soot). Curve (ii) of FIG. 2 illustrates an asymptotic decrease in NOx emissions similar to that of Curve (i) where, in addition to providing a constant volumetric flow rate of fuel into the engine, hydroxyl species present in the combustion chambers 18 drive fuel oxidation further toward a complete burn at an AFR ranging from values greater than 16 to at least 25. Curve (iii) of FIG. 2 illustrates still another asymptotic decrease in NOx emissions where a constant volumetric flow rate of primary fuel is provided into the engine and, in addition to providing hydroxyl radicals in the combustion chambers 18, a secondary fuel, HOH generated in the gas production module 94 by electrolysis, provides non-carbonaceous oxidant and fuel in the combustion chambers 18 while varying the AFR among values greater than 16 to at least 21. With both the entrained hydroxyl radicals and the secondary fuel being input to the combustion chambers, the NOx emissions dropped by up to about 75%.

The portion of the evaluation performed under conditions of providing no Reactive Hydrogen input to the cylinders 18, as a control, indicates that NOx emissions can be suppressed in an engine operating with a primary fuel by adjusting the AFR to be more fuel lean relative to the stoichiometric ratio. Providing a quenching species such as OH— in the combustion chambers 18 results in further suppression of NOx emissions than that observed under the control conditions corresponding to Curve (i) of FIG. 2 but, advantageously, it was also found that power output of the engine increased substantially, e.g., to a range comparable to that observed when the AFR is fuel-rich. In limited testing, providing the quenching species without electrolysis (as per Curve (ii) of FIG. 2) and a Reactive Hydrogen species with water electrolysis (per Curve (iii) of FIG. 2) were each found to further suppress NOx emissions to levels lower than observed when operating under the control conditions resulting in the data in Curve (i) of FIG. 2. Further, application of a quenching species without electrolysis and application of a Reactive Hydrogen species with water electrolysis both have been found to provide further NOx reductions as a function of the operating temperature of the aqueous tank solution. At least over a limited range, the NOx emissions were reduced as a function of increasing the temperature of the aqueous solution in the tank. In one embodiment, the temperature of an aqueous solution in the tank 96 can be elevated with a thermostatically controlled tank heating system 100 that provides, for example, heated fluid from the engine coolant system for circulation about the aqueous solution. The tank heating system 100 is schematically indicated in FIG. 1 by a heating coil wrapped about the tank 96. In some instances, the level of NOx may initially decrease as temperature of the electrolytic bath increases and, after reaching a minimum, increase with increasing temperature.

With a conventional engine arrangement, having no injection of secondary gas 90 into the combustion chamber 18, the NOx emissions were reduced by up to 45 percent by shifting the AFR to values greater 14.9. With injection of secondary fuel at a fixed rate of 1.2 standard liters per minute (slm), the NOx emissions dropped by up to about 75% when the secondary gas 90 comprised HHO.

Figure 3:
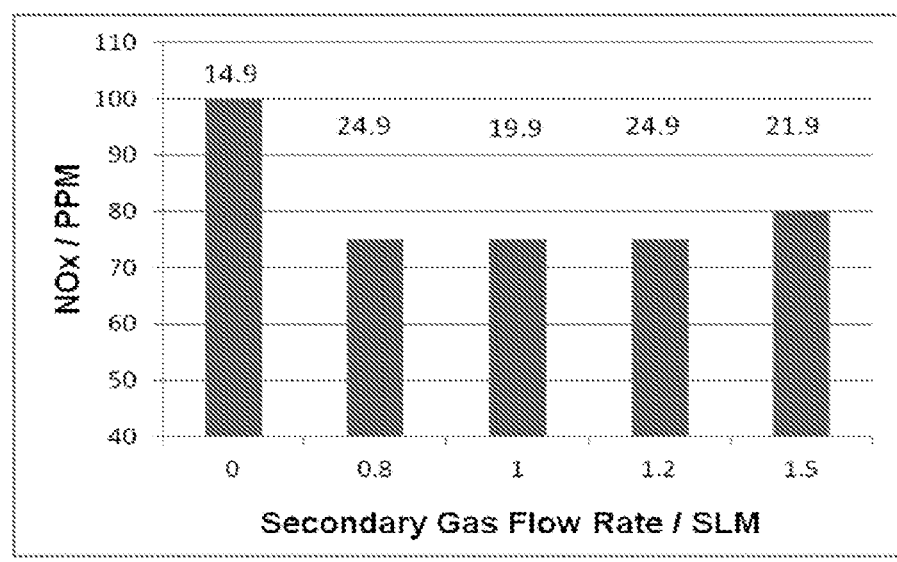
FIGS. 3 and 4 illustrate a functional relationship between flow rate of Reactive Hydrogen injected as a secondary gas into the engine of FIG. 1 and the suppression of NOx emissions.
Figure 4:
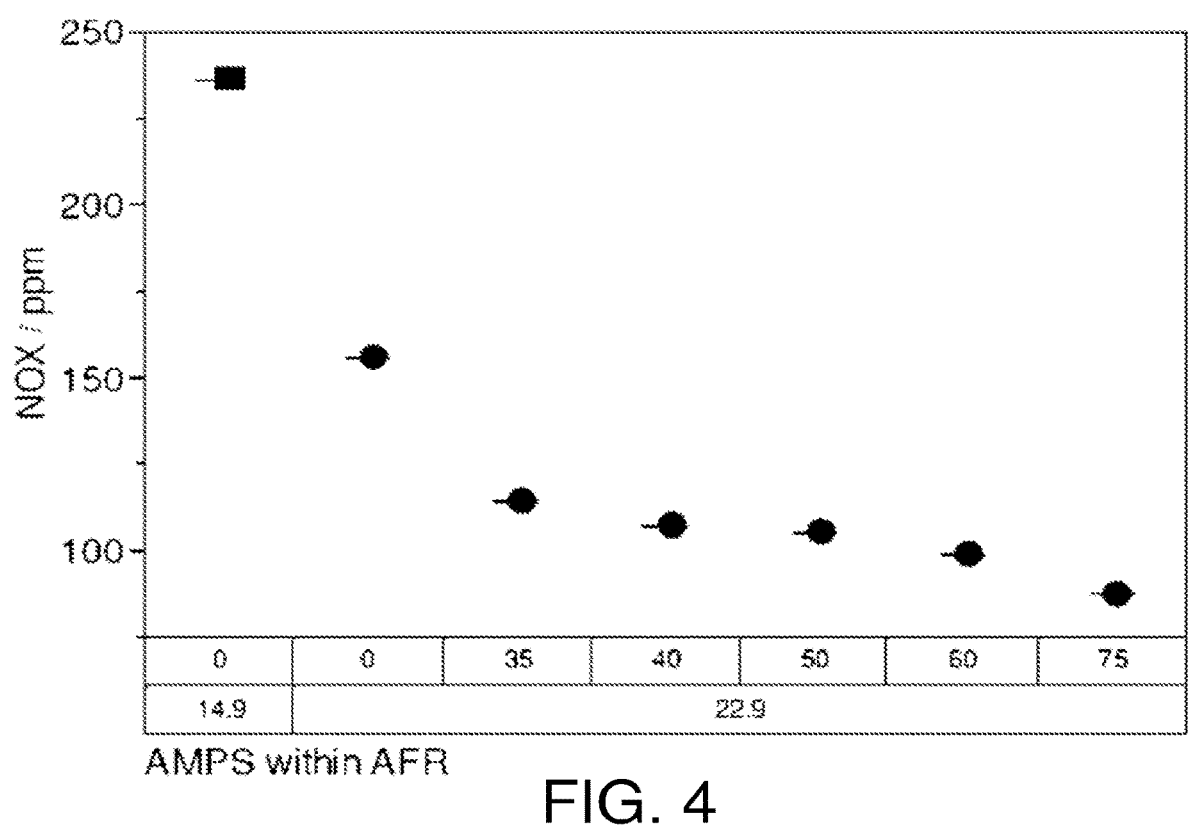

FIGS. 3 and 4 illustrate suppression of NOx emissions as a function of the amount of secondary fuel comprising Reactive Hydrogen, injected as the secondary gas 90, into the air-intake manifold of the same TDI engine for which NOx emissions data of FIG. 2 were acquired. The Reactive Hydrogen species included both oxidant and non-carbonaceous fuel (e.g., in the form of HHO). The NOx levels were found to initially decrease as the injection rate of the secondary fuel increased, by at least 40 percent more than observed for the control illustrated as curve (i) in FIG. 2. For the TDI engine this effect was observed as the rate of secondary fuel injection increased from zero up to 1.2 slm. Beyond the fuel injection rate of 1.2 slm, significant declines in the NOx emissions level were not observed and at 1.5 slm an increase in the NOx emissions level was observed.

The data of FIGS. 1 and 2 confirm that, based on the combination of injecting HHO comprising Reactive Hydrogen and entrained OH" into the combustion chamber, and varying the Air to Fuel Ratio (AFR), the emissions level can be optimized across the range of fuel demand levels by up to 75 percent or more. In addition to there being a temperature dependence on generation of the secondary gas 90, both with and without electrolysis, the volume of Reactive Hydrogen (liters per minute) produced with the gas production module 94 can be increased by injecting a gas into the tank with the pump 98.

Although operation according to the invention is not dependent on understanding of a specific theory, the described reduction in NOx emission levels, irrespective of engine speed, may, at least in part, be due to suppression of thermal NOx production. Cyclic formation of atomic nitrogen species per Equations (1) and (2) may be contained to limit NOx generation. The afore described presence of OH" during combustion may limit the regenerative reaction sequence of equations (1) and (2), which sequence would otherwise continue production of N and NO as per the Zeldovich mechanism. Providing hydroxyl radicals during hydrocarbon oxidation in the combustion chamber may create a major sink for atomic nitrogen that terminates NOx formation chain reactions as shown in Equation (5):

N±OH4H±NO  (5)

In this sense, hydroxyl radicals may act as the quenching species. By entraining an adduct comprising OH" when the cell reservoir tank 96 contains, for example, an aqueous solution of KOH, NOH, NaOH or NH4OH in which case the adduct may be H2O.OH, with the secondary gas 90 entering the engine air intake manifold, the adduct is carried into the combustion chamber where the OH disassociates from the adduct molecule and interacts with atomic nitrogen per Equation (5).

If NOx suppression is based on such a quenching mechanism, the NOx emissions may be limited but not eliminated completely, e.g., to the extent Prompt NOx production and Fuel NOx production mechanisms are not affected by quenching agents.

In order to fully describe the operation of the engine according to the invention, a brief review of engine operating conditions is provided. The ECU 20 manages the fuel injectors by referencing a library of resident "look-up" tables to know what to do under each and every operational condition. In the light load mode, with the engine at "normal" operating temperature, the engine may operate in a closed loop, using the oxygen sensor output data to determine the fuel injection rate from the fuel look-up tables, to afford optimum power.

Adaptive feedforward control is a common approach for handling uncertainties and time-varying effects, such as in automotive control applications. The adaptation of the feedforward controller is often combined with a linear feedback controller. The feedforward controller (usually in the form of look-up tables) is used to overcome the nonlinearities that are due to variations of the operating point, while the feedback controller is used to manage fast disturbances. If the engine behavior is changing, for example due to stacked tolerances, the feedforward controller using the look-up table data, provides an adaptive function; and the ECU can routinely modify the inputs from the lookup tables to compensate for tolerance stacking. Tolerance stacking arises because engine parts are manufactured within tolerances to the ideal measurement, and all these variations from ideal specifications may add up. The ECU must also routinely modify the inputs from the look-up tables to compensate for engine wear and tear, variations in fuel quality, and variations in ambient/atmospheric conditions. However, there is a lag between the feedback controller and the adaptation of the feedforward controller which can create phase shifts that must be decoupled to avoid instabilities in the control system. Ideally, the decoupling method should not depend on the structure of the feedforward controller (i.e., the structure of the look-up tables); nor should it depend on the method of the adaptation.

Figure 5:
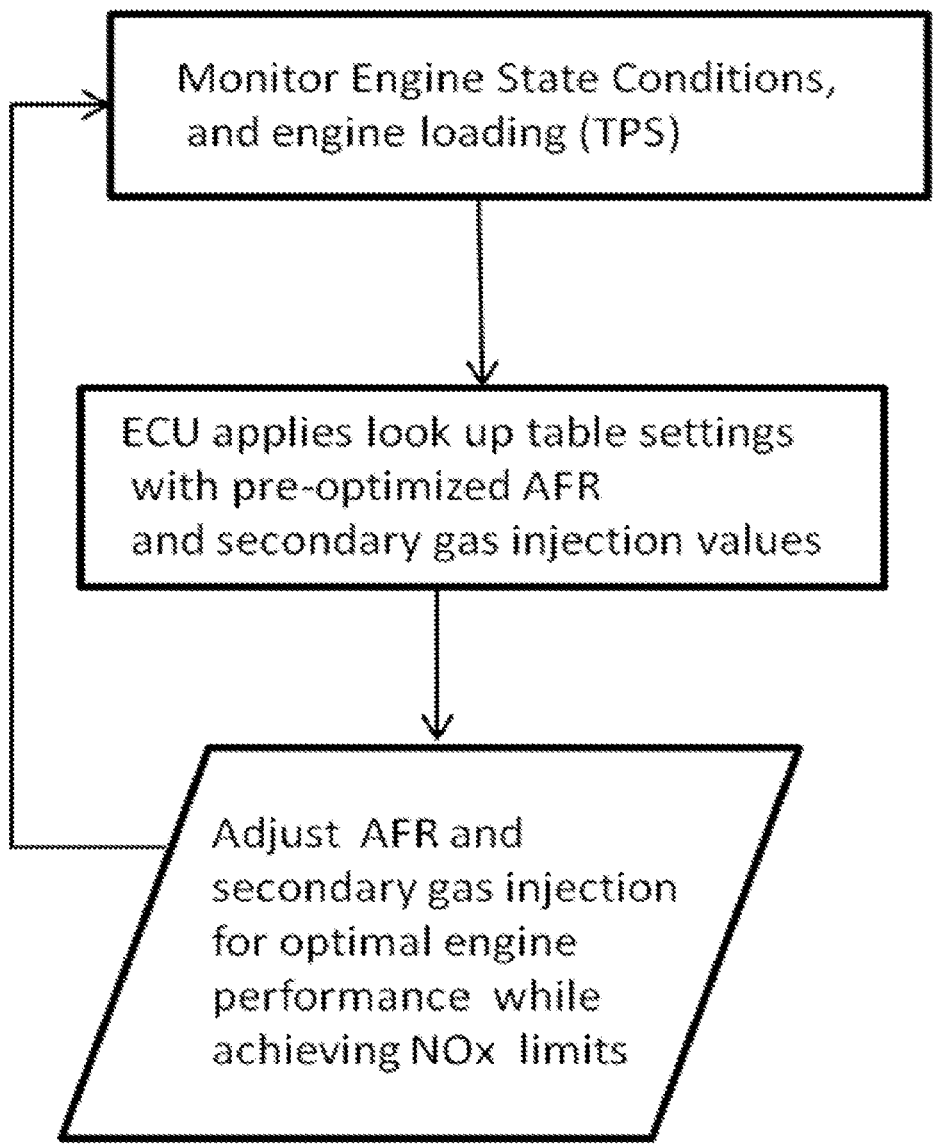
FIGS. 5 and 6 are flow diagrams of an ECU monitoring engine state conditions and applying data from look-up tables to control engine operations.
Figure 6:
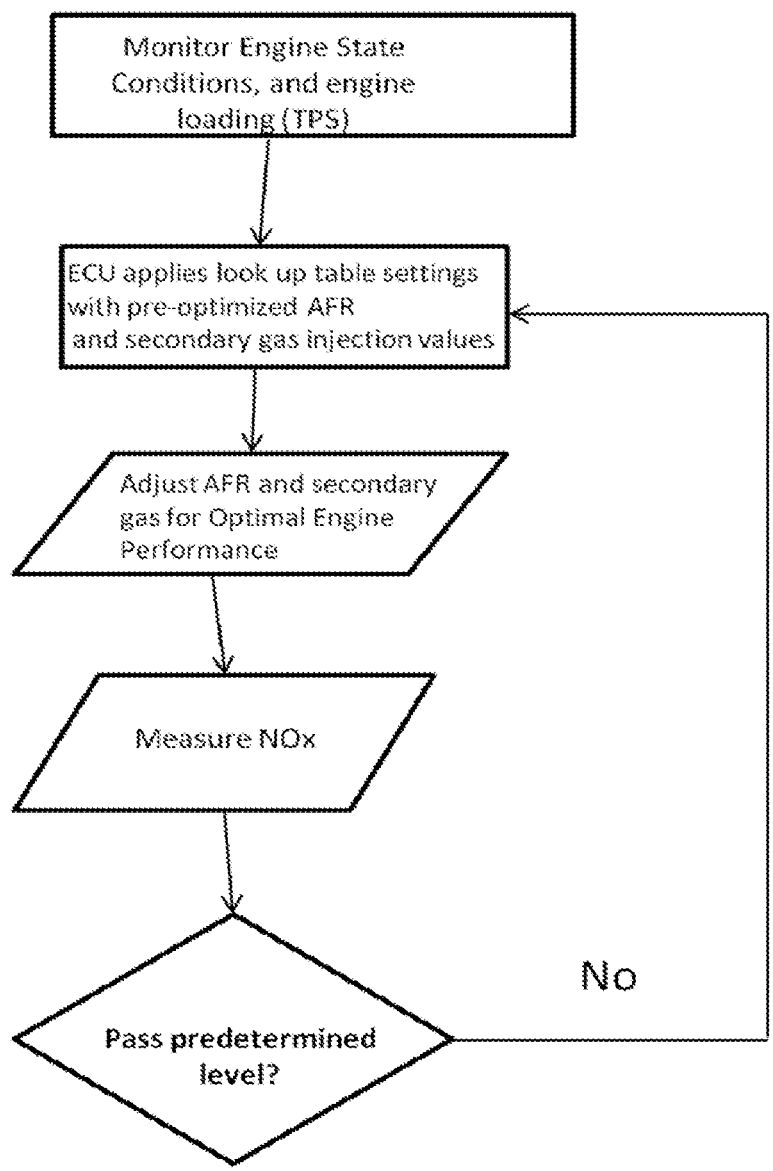

As shown in the flow diagrams of FIGS. 5 and 6, the ECU 20 monitors engine state conditions and engine loadings via the throttle position sensor TPS50. The state conditions include the air pressure, density, and temperature in the intake manifold which, when combined with other information (such as NOx emission level, changing loads, and driver demands), enables the ECU 20 to identify from a look-up table predetermined, but possibly suboptimal, AFR and secondary gas injection rates. These values are expected to provide desired levels of improved engine performance while assuring that NOx emissions levels comply with predetermined limits. Data made available to the ECU through the look-up tables can be acquired by exercising the engine through a series of loading based on dynamic operating conditions. For example, noting that both engine power and optimal NOx reduction are influenced by several engine-related dependent variables (e.g., exhaust gas temperature, O2 levels in the exhaust gases, manifold absolute pressure (MAP), exhaust pressure, intake manifold air temperature, Inlet Air Temperature (before turbocharge), Mass Air Flow (MAF) and barometric pressure), a set of independent variables are adjusted for individual engine operating states, including transient states, to identify values of the variables in the set which yield optimum performance, including minimum emissions under individual operating conditions. Optimum performance may require tradeoffs between, for example, any of fuel economy, engine power and NOx emissions levels for each operating state. The set of independent variables includes AFR, adjusted by changing PWM signals which control fuel injection, the amount of secondary gas input to the combustion chamber and the level of Exhaust Gas Recirculation (monitored with an EGR Differential Pressure Sensor). The operating conditions may include all operating modes of the engine system 10, including normal accelerations, cruise steady state conditions through the range of operating speeds, and variable road conditions such as when hill climbing is performed in a high gear (e.g., between 40 mph and 60 mph). Thus, the data stored in the look-up tables provide real-time adjustable settings known to provide acceptable or desirable performance during the wide range of dynamic operating conditions. The values of the settings are based on prior determinations of how, collectively, each independent variable in the set is can be controlled for an acceptable or optimum predetermined level of performance.

Then, in addition to use of look-up tables to determine AFR and secondary gas injection rates, fuel settings (e.g., injector pulse width) and intake air settings (e.g., manifold pressure), the emissions control system 8 can refine the secondary gas injection rate to optimize the power and fuel economy, subject to achieving predetermined NOx emissions limits. As indicated in FIG. 6, the system can make a determination of NOx emissions compliance (based on sensor readings) and readjust the control settings to both meet emissions limits and optimized engine performance.

Figure 7:
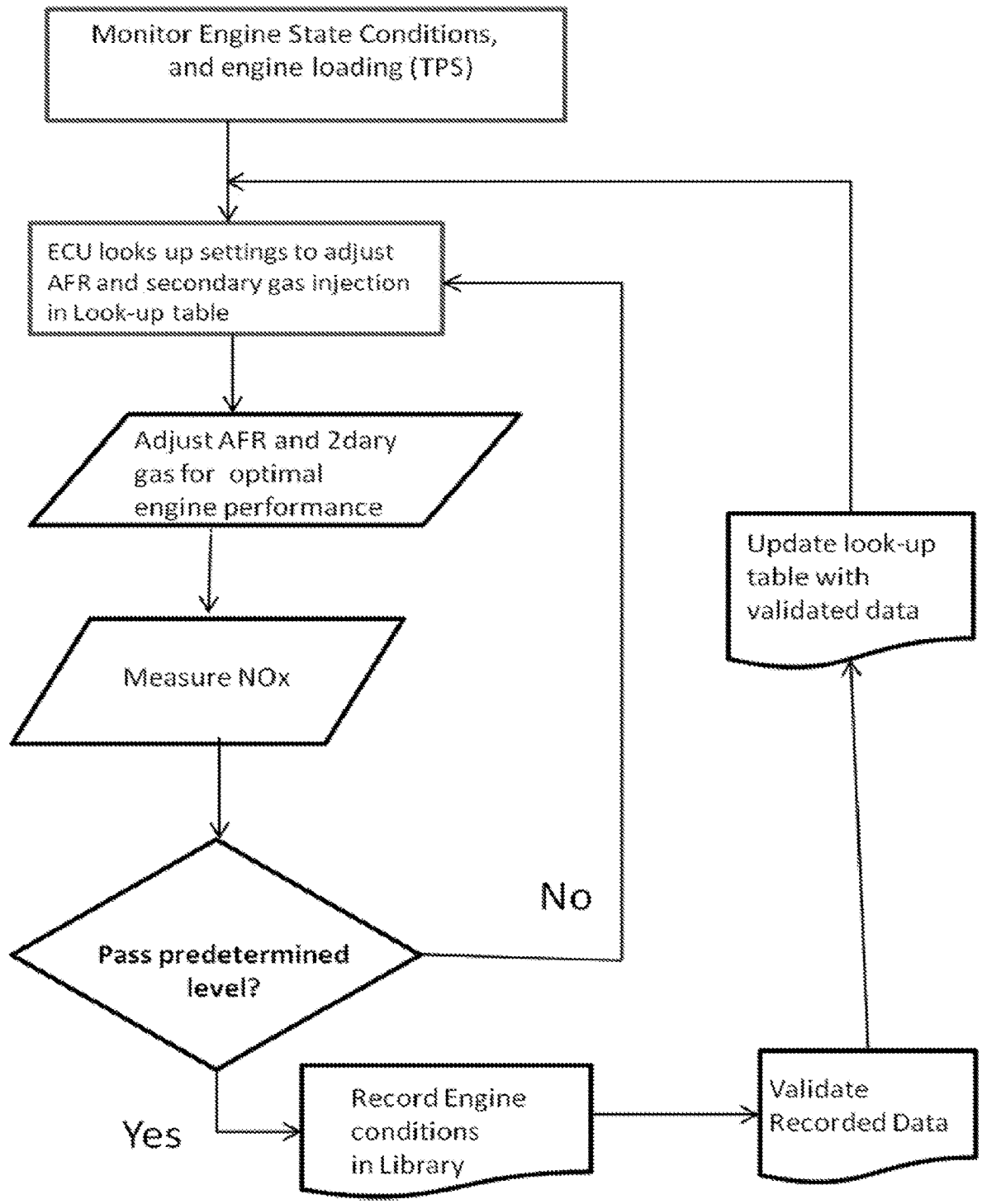
FIG. 7 is a flow diagram illustrating an ECU operating in a self-training mode.

The "closed loop" look-up tables, providing varied AFR and secondary gas injection rates, may be optimized for minimum NOx emissions without compromising engine performance relative to that which is achievable with control systems which operate with a constant AFR and no secondary gas injection. These table values may be continuously updated by operating the engine control system in an unsupervised machine learning mode, as shown in FIG. 7. While monitoring state conditions and engine loading, the process begins with use of initial look-up tables which may contain minimal data. New data for fuel-oxidant mixtures that afford predetermined pollutant levels are captured and validated based on adaptive phenomenological models that relate engine performance and pollution emissions to engine settings such as air to-fuel ratios, engine speed (rpm), air density in the intake manifold, secondary gas production rates, changing loads, engine tolerance characteristics, driver demands, etc. to refine the models. The ECU 20 operates in a mode where settings can be initialized. Then the ECU is trained according to an adaptive machine learning algorithm model by providing a learning algorithm with training data to learn from. The results from the analyses are automatically added to the look-up table. The lookup tables and feedback control mechanism according to the invention also apply to engine conditions which do not require providing any secondary gas in order to comply with the NOx emissions or optimum power generation.

Figure 8:
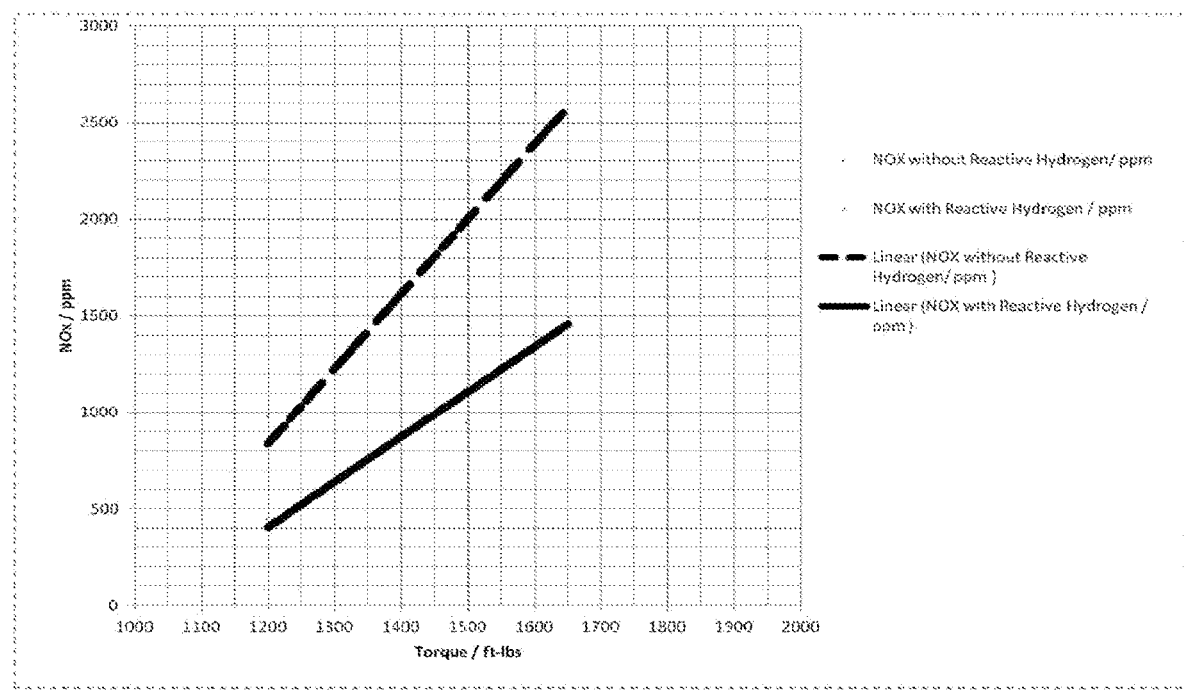
FIGS. 8 through 10 illustrate performance of the emissions control system under a hill climb simulation performed on an 18-wheel tractor trailer accelerating from 40 MPH to 70 MPH while in the highest of the transmission gears.
Figure 9:
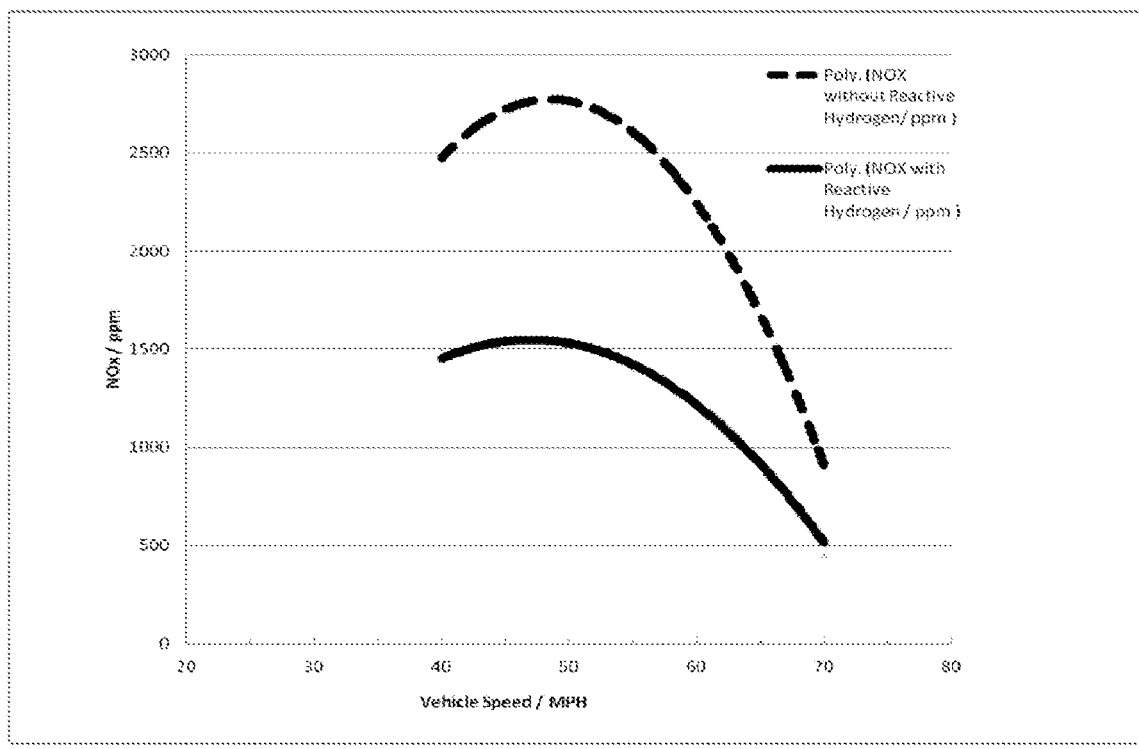
Figure 10:
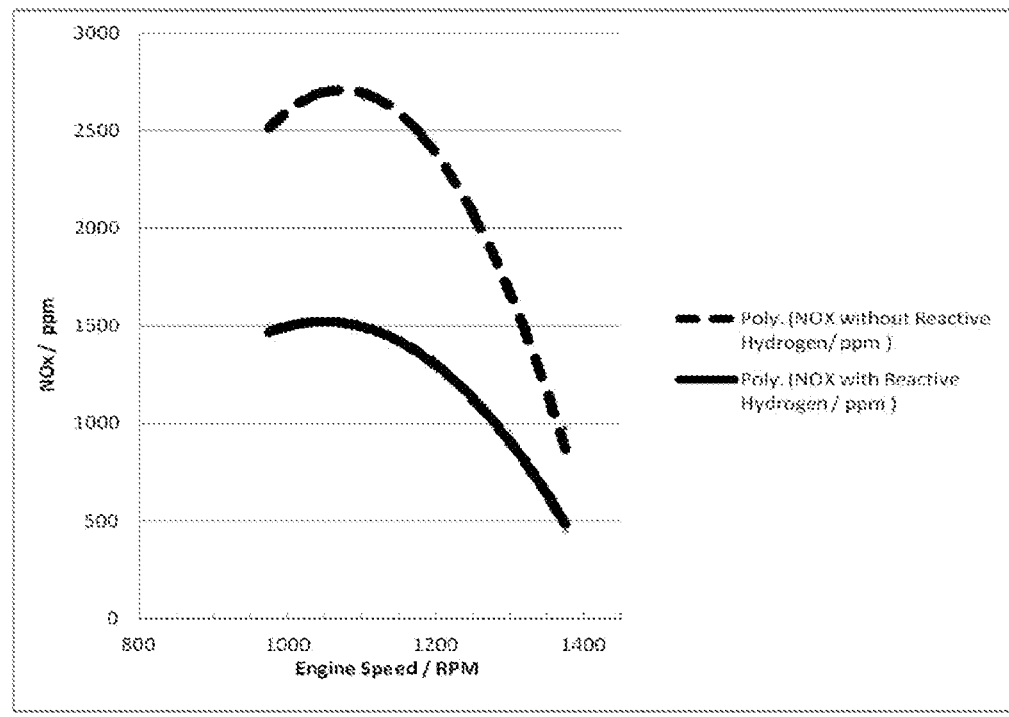

FIGS. 8 through 10 illustrate performance of the emissions control system 8 under a hill climb simulation performed on an 18-wheel tractor trailer accelerating from 40 MPH to 70 MPH while in the highest of the transmission gears. In the acceleration mode, the fuel pressure was maintained at 28000 psi, the fuel injection duty cycle was independently set to 80% (i.e., 30 ms pulse width during the entire acceleration), and the EGR was independently set at 26% duty cycle. All other variables were set by ECU from look up tables. An aqueous solution of KOH in the tank 96 was at 30 C, to produce a constant flow of Reactive Hydrogen at the rate at 3.5 slm. In each of the figures, the dashed line curve illustrates NOx emissions during maximum acceleration of the vehicle while the engine 10 consumes only primary fuel in accord with conventional regulation of AFR by the ECU 20. No use of Reactive Hydrogen or other secondary gas was input to the engine. In each of the figures the solid line curve illustrates NOx emissions during maximum acceleration of the vehicle powered with the same primary fuel while receiving Reactive Hydrogen as a secondary fuel into the combustion chambers 18. Both the secondary fuel and AFR for primary fuel were adjusted for reduced NOx emissions, e.g., based on data relating to engine dependent operating variables. The tank solution temperature was 30 C.

Referring to FIG. 7, the NOx emissions levels are shown to increase with torque in a linear manner. Notably the NOx emissions for the solid line curve, corresponding to injection of a secondary fuel, has a shallower curve than does the dashed line curve. FIG. 6 illustrates that during the majority of the acceleration, e.g., between 40 MPH and 60 MPH, the emissions control system suppresses the emissions level substantially, at times by more than 1,000 ppm.

Features of the invention have been illustrated for engines having OEM electronic control systems and are especially suitable to systems having ECMs which use tale look-up data to optimize engine performance. In one series of embodiments, such engines may be equipped with custom versions of data accessed by an electronic control module to cooperatively operate an emissions control system without compromising engine performance provide one or more of the functionalities which have been disclosed.

While the invention has been described with reference to particular embodiments, it will be understood by those skilled in the art that various changes may be made, and equivalents may be substituted for elements thereof without departing from the scope of the invention. Accordingly, the scope of the invention is only limited by the claims which follow.

The invention claimed is:

1. A method for reducing NOx emissions during operation of an internal combustion engine in commerce which, when burning liquid hydrocarbon fuel as a primary fuel, in the absence of any secondary fuel, has a characteristic stoichiometric ratio, the method comprising:
   providing a free nitrogen quenching species for interaction with constituents present during oxidation of the primary fuel in a combustion chamber of the engine while operating the engine at an air-to-fuel ratio greater than the characteristic stoichiometric ratio,
   where the free nitrogen quenching species is a hydroxyl radical carried into the combustion chamber in an adduct, and
   where the hydroxyl radical is provided by entrainment in air passing through an aqueous solution comprising KOH, NaOH, or NH4OH.

2. A method for reducing NOx emissions during operation of an internal combustion engine in commerce which, when burning liquid hydrocarbon fuel as a primary fuel, in the absence of any secondary fuel, has a characteristic stoichiometric ratio, the method comprising:
   providing a free nitrogen quenching species for interaction with constituents present during oxidation of the primary fuel in a combustion chamber of the engine while operating the engine at an air-to-fuel ratio greater than the characteristic stoichiometric ratio,
   where the quenching species is entrained in a secondary gas passing through an air intake manifold and into the combustion chamber,
   where the secondary gas is emitted from an aqueous solution, and
   where the quenching species is placed in solution with water and is entrained as a constituent of the secondary gas as a gas passes through the aqueous solution.

3. A method for reducing NOx emissions during operation of an internal combustion engine in commerce which, when burning liquid hydrocarbon fuel as a primary fuel, in the absence of any secondary fuel, has a characteristic stoichiometric ratio, the method comprising:
   providing a free nitrogen quenching species for interaction with constituents present during oxidation of the primary fuel in a combustion chamber of the engine while operating the engine at an air-to-fuel ratio greater than the characteristic stoichiometric ratio,
   where the quenching species is placed in an aqueous solution and entrained in a secondary gas by passing air through the solution in the absence of electrolytic activity that produces Reactive Hydrogen from water molecules.

4. The method of claim 3 wherein the secondary gas comprises air, water vapor, and OH—.

5. A method for reducing NOx emissions during operation of an internal combustion engine in commerce which, when burning liquid hydrocarbon fuel as a primary fuel, in the absence of any secondary fuel, has a characteristic stoichiometric ratio, the method comprising:
   providing a free nitrogen quenching species for interaction with constituents present during oxidation of the primary fuel in a combustion chamber of the engine while operating the engine at an air-to-fuel ratio greater than the characteristic stoichiometric ratio,
   where the free nitrogen-quenching species is a hydroxide derived from an inorganic source and is in solution with a Group 1 metal or a Group 2 metal.

* * * * *